G. J. ENGERT.
VEHICLE WHEEL.
APPLICATION FILED JAN. 30, 1912.
1,057,047.
Patented Mar. 25, 1913.
2 SHEETS—SHEET 1.
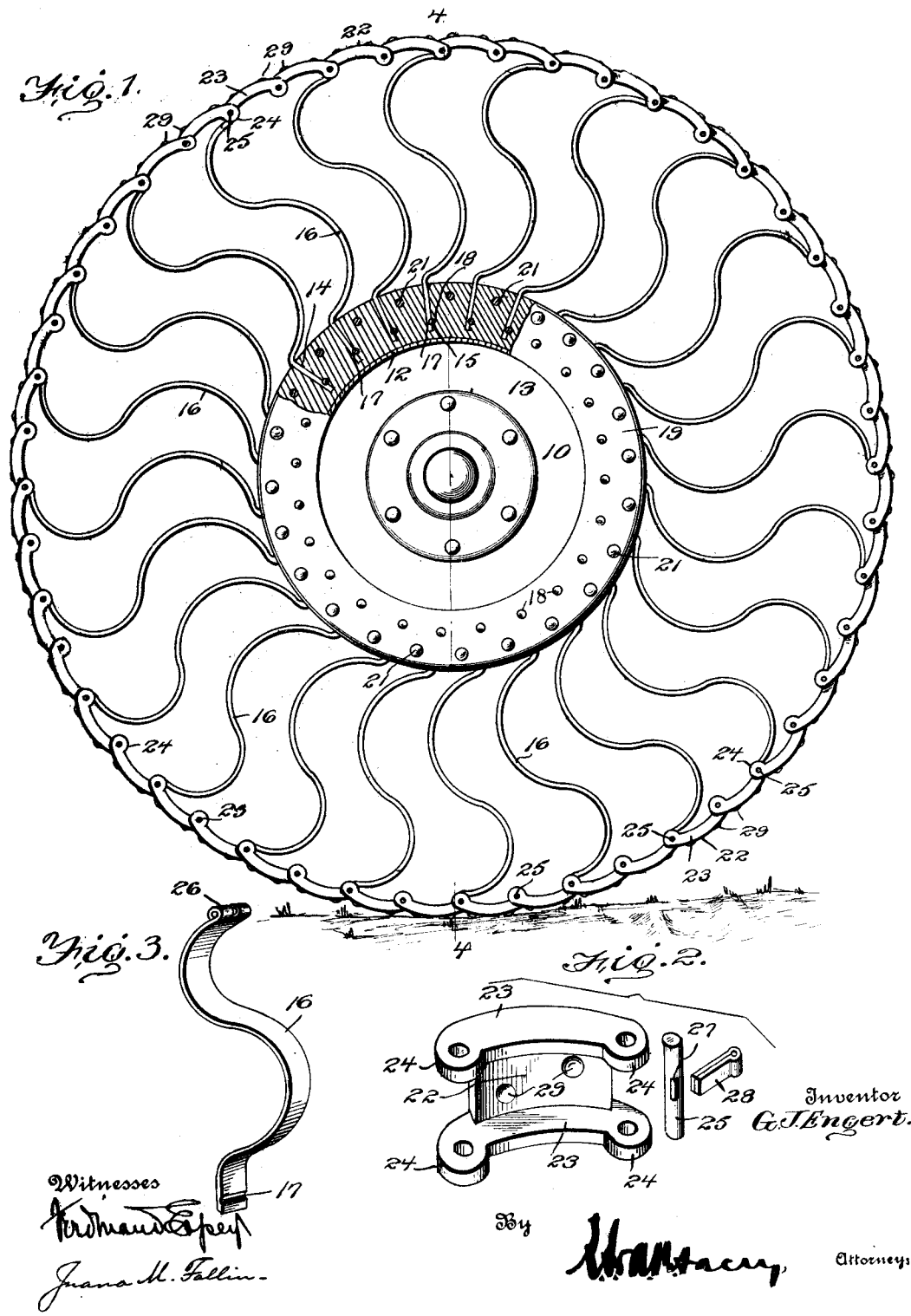

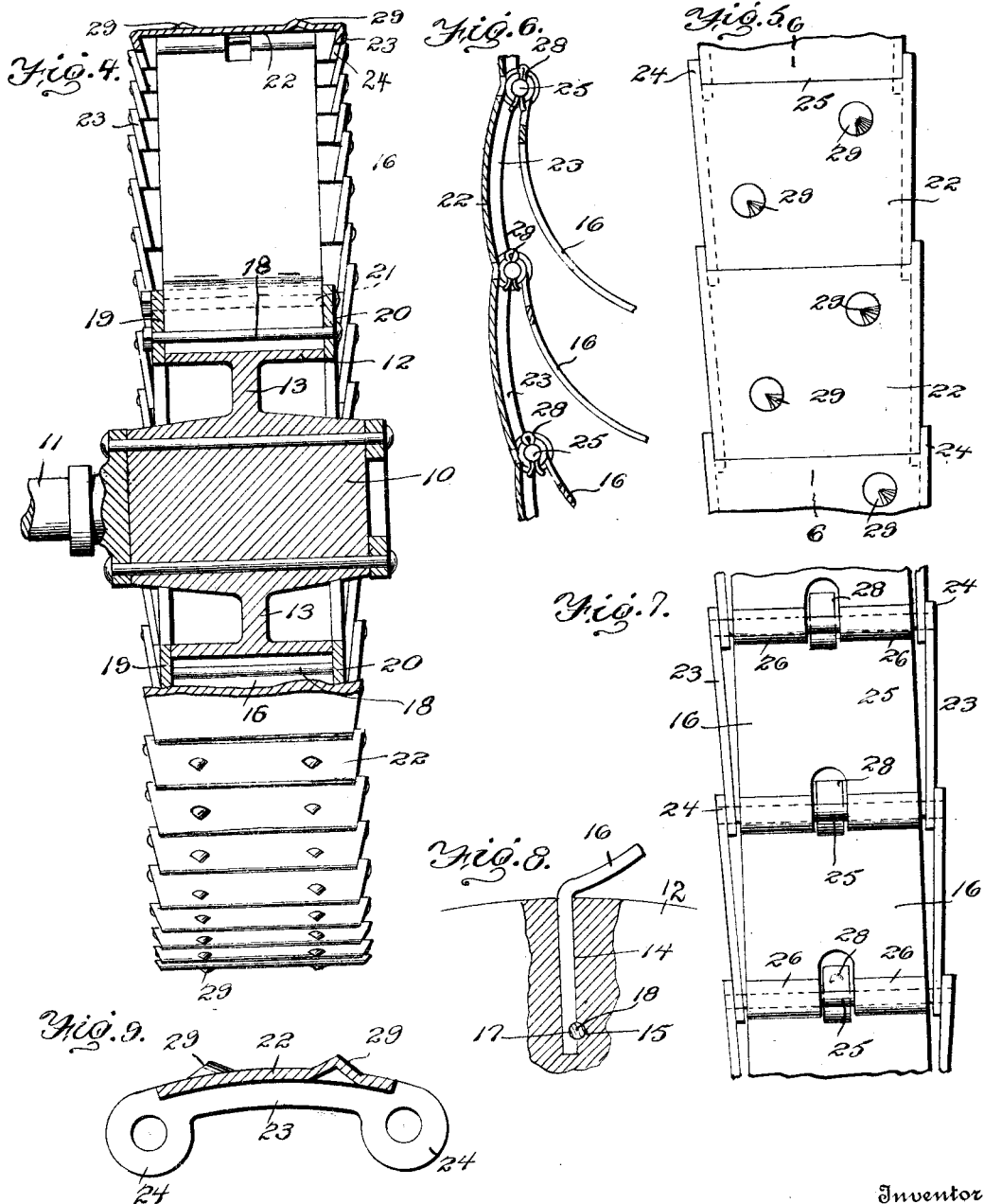

UNITED STATES PATENT OFFICE.

GEORGE J. ENGERT, OF SPOKANE, WASHINGTON.

VEHICLE-WHEEL.

1,057,047.  Specification of Letters Patent. Patented Mar. 25, 1913.

Application filed January 30, 1912. Serial No. 674,406.

*To all whom it may concern:*

Be it known that I, GEORGE J. ENGERT, citizen of the United States, residing at Spokane, in the county of Spokane and State of Washington, have invented certain new and useful Improvements in Vehicle-Wheels, of which the following is a specification.

This invention relates to vehicle wheels, more particularly to the class of resilient wheels, and has for its object to improve the construction and increase the efficiency and utility of devices of this character.

Another object of the invention is to provide a device of this character wherein a flexible and yieldable tire device is employed and associated with a plurality of yieldable spokes.

Another object of the invention is to provide a device of this character whereby the different units constituting the wheel may be renewed in event of impairment or breakage without discarding the remainder of the wheel.

With these and other objects in view, the invention consists in certain novel features of construction as hereafter shown and described, and then specifically pointed out in the claim, and in the drawings illustrative of the preferred embodiment of the invention: Figure 1 is a side elevation of the improved wheel partly in section; Fig. 2 is a perspective view of one of the tire plates viewed from beneath together with one of its pins and keys; Fig. 3 is a perspective view of one of the spokes detached; Fig. 4 is a section on the line 4—4 of Fig. 1; Fig. 5 is an enlarged detail from the outside, of a portion of the flexible tire; Fig. 6 is a section on the line 6—6 of Fig. 5; Fig. 7 is a view similar to Fig. 5 viewed from the inside; Fig. 8 is a sectional detail illustrating the manner of securing the spokes in the hub; Fig. 9 is a sectional detail of one of the tire plates.

Corresponding and like parts are referred to in the following description and indicated in all the views of the drawings by the same reference characters.

The improved wheel comprises in general a hub portion, a yieldable rim or tire portion, and yieldable spring spokes connecting the tire and the hub. The hub of the improved wheel comprises a central or body portion 10 bolted or otherwise secured to the axle represented at 11, and with an outer annular portion 12 connected to the body by a web 13. The annular portion 12 is provided with a plurality of outwardly opening slots or recesses 14 spaced apart and adapted to receive the inner ends of the spokes, and corresponding therefore in number with the spokes of the wheel. Each of the recesses extends entirely through the annular member 12 and each recess is provided near its inner end with a semi-circular groove or half socket 15. Each spoke 16 is formed from a single strip of resilient metal, preferably steel, and curved in S-shape as shown. At their inner ends each spoke is formed to fit in one of the recesses 14 and is provided with a transverse half socket 17 corresponding to the half socket 15, so that when the spokes are inserted into the recesses, the half sockets 15—17 register or form a complete circular cavity to receive a locking pin 18 and thus lock the spokes to the hub. Bearing upon opposite faces of the annular member 12, are annular clamp plates 19—20, the plates bearing against the portions of the spokes which are inserted into the recesses and through which the locking pins pass and secured by nuts or other fastening devices. By this means the spokes are independently secured and any broken or impaired spoke may be removed and replaced by a new spoke without disturbing the other spokes or other parts. The plates 19—20 are further secured in position by transverse bolts or like fastening devices 21 which pass through the plates and likewise through the portions of the annular member between the recesses 14. Any required number of the fastening devices may be employed, but preferably one will be inserted between each pair of the recesses, as shown.

The tire portion of the improved device is constructed from a plurality of plates hingedly united, and as the plates are precisely alike, the description of one will suffice for all. Each of the tire plates is constructed from a curved body portion 22 having sides 23 extending at right angles thereto and likewise extending beyond the body to form oppositely arranged perforated ears 24 through which tie bolts 25 extend. The sides 23 of the tire plates are spaced slightly nearer each other at one end that at the other so that the ears of the narrow ends of the plates engage between the wider ears of the next plate, as represented in Figs. 4, 5 and 6. By this arrangement the tire presents a substantially continuous surface by the outer curved plates 22, the spaces between the terminals of the plates being relatively slight, as shown.

At their outer ends the spokes 16 are formed with spaced eyes 26, and the pins 25 are each provided with a key slot 27 intermediate the ends which come opposite the space between the ears 26, so that after the bolts or pins 25 are located in position a spring key 28 may be inserted through each of the keyways 27 and thus lock the tire plates and spokes together. The keys 28 will preferably be of the split form so that after being driven into their keyways they may be clenched at their split ends to prevent their displacement under the jars and concussions to which the wheel will be subjected.

When assembling the different parts of the wheel a certain degree of "tension" will be employed between each spring spoke and the links comprising the tire so that the spokes coact with the link members and retain the latter in strained or tight condition. The degree of tension will correspond to the carrying capacity of the vehicle on which the wheel is employed.

It will thus be obvious that a simply constructed strong and durable wheel is produced with a yieldable or flexible tire, and likewise with a yieldable body or intermediate portion produced by the flexible spokes 16 which will readily adapt itself to inequalities of the road and absorb the jars and concussions and prevent them from being transmitted to the body of the vehicle.

The metal of the body portions 22 of the tire plates is pressed outwardly at intervals as represented at 29, to produce projections or spurs externally of the plates to prevent the wheel from "skidding" or slipping in turning curves or angles, or when moving over slippery roads. The spurs also assist the wheel in climbing hills or grades.

The improved device is simple in construction, can be inexpensively manufactured of any required size, and of any required strength, as the strength of the wheel may be increased by simply enlarging the parts or increasing the width of the spokes, and the plates and hub members.

It will be noted that by this arrangement a very strong, compact and yet yieldable wheel is produced with the parts firmly and yet yieldingly united, which is maintained in a very tight close condition under all circumstances, and regardless of the indentations which may be made in the outer portion by the strain of the load to which the wheel is subjected. Each of the springs sustains a certain amount of the tension when the load is applied and the amount of the tension may be readily ascertained and the wheel increased or decreased in strength to correspond therewith.

Having thus described the invention, what is claimed as new is:

In a wheel, a hub, a plurality of resilient spokes connected by their inner ends to said hub and each having eyes spaced apart at their outer ends, a rim formed of a plurality of curved plates having inwardly directed sides enlarged into ears at the ends, pins extending through the ears and thereby pivotally uniting the plates end to end, each pin being engaged by the eyes of the spokes and provided with a transverse slot located opposite the space between said eyes and a key inserted through each slot and between the spaced eyes of the spokes.

In testimony whereof, I affix my signature in presence of two witnesses.

GEORGE J. ENGERT. [L. S.]

Witnesses:
 NEIL C. BARDSLEY,
 JNO V. MULLIGAN.